(12) United States Patent
Svantesson et al.

(10) Patent No.: US 10,378,159 B2
(45) Date of Patent: Aug. 13, 2019

(54) DETECTION OF SHORT TERM IRREGULARITIES IN A ROAD SURFACE

(71) Applicant: NIRA DYNAMICS AB, Linkoping (SE)

(72) Inventors: Thomas Svantesson, Linkoping (SE); Robert Johansson, Linkoping (SE); Olle Noren, Linkoping (SE)

(73) Assignee: NIRA DYNAMICS AB, Linköping (SE)

( * ) Notice: Subject to any disclaimer, the term of this patent is extended or adjusted under 35 U.S.C. 154(b) by 135 days.

(21) Appl. No.: 14/913,684

(22) PCT Filed: Jun. 9, 2015

(86) PCT No.: PCT/EP2015/001158
§ 371 (c)(1),
(2) Date: Feb. 22, 2016

(87) PCT Pub. No.: WO2015/188930
PCT Pub. Date: Dec. 17, 2015

(65) Prior Publication Data
US 2016/0201277 A1    Jul. 14, 2016

(30) Foreign Application Priority Data

Jun. 9, 2014  (DE) .................. 10 2014 008 501
Jun. 10, 2014 (DE) .................. 10 2014 008 588

(51) Int. Cl.
*G01B 21/30*   (2006.01)
*E01C 23/01*   (2006.01)

(52) U.S. Cl.
CPC ............. *E01C 23/01* (2013.01); *G01B 21/30* (2013.01)

(58) Field of Classification Search
CPC .................................. G01B 21/30; E01C 23/01
See application file for complete search history.

(56) References Cited

U.S. PATENT DOCUMENTS 4,422,322 A     12/1983  Spangler
5,762,366 A  *  6/1998  Faye ................... B60G 17/0185
                                                         280/735

(Continued)

FOREIGN PATENT DOCUMENTS

DE          195 49 083 A1    7/1997
DE       10 2008 054 476 A1  6/2010
WO        WO 2011/054363 A1  5/2011

OTHER PUBLICATIONS

PCT International Search Report for counterpart PCT Application No. PCT/EP2015/001158, 3 pp., (dated Sep. 29, 2015).

(Continued)

*Primary Examiner* — Stephen W Smoot
(74) *Attorney, Agent, or Firm* — Womble Bond Dickinson (US) LLP

(57) ABSTRACT

The present invention relates to the detection of a short term irregularity under a driving vehicle having a first wheel, by determining a first sensor signal indicative of time dependent vibrations at the first wheel, using a first sensor; determining a second sensor signal indicative of a vertical movement the vehicle chassis, using a second sensor; and detect a short term irregularity of a road surface under the driving vehicle based on the first sensor signal and the second sensor signal.

15 Claims, 9 Drawing Sheets

(56) References Cited

U.S. PATENT DOCUMENTS

| | | | | |
|---|---|---|---|---|
| 2008/0110249 A1* | 5/2008 | DeGeorge | ............... | G01C 7/04 73/146 |
| 2012/0197588 A1* | 8/2012 | Lee | ..................... | G07C 5/0858 702/141 |
| 2013/0030680 A1* | 1/2013 | Friedlander | ........... | B60W 40/06 701/117 |
| 2013/0169794 A1* | 7/2013 | Shimomura | ............ | E01C 23/01 348/128 |
| 2016/0060824 A1* | 3/2016 | Akashi | .................... | E01C 23/01 348/148 |

OTHER PUBLICATIONS

PCT Written Opinion of the International Searching Authority for counterpart PCT Application No. PCT/EP2015/001158, 6 pp., (dated Sep. 15, 2015).

* cited by examiner

DETECTION OF SHORT TERM IRREGULARITIES IN A ROAD SURFACE

CROSS-REFERENCE TO RELATED APPLICATIONS

This patent application is a U.S. National Phase Application under 35 U.S.C. § 371 of International Application No. PCT/EP2015/001158, filed Jun. 9, 2015, entitled DETECTION OF SHORT TERM IRREGULARITIES IN A ROAD SURFACE, which claims priority to German Patent Application No. 10 2014 008 501.5, filed Jun. 9, 2014, and German Patent Application No. 10 2014 008 588.0, filed Jun. 10, 2014.

TECHNICAL FIELD

The present disclosure relates generally to the estimation of the road surface condition under a vehicle and, for example, to systems, methods, and computer program products for estimating the road surface condition under a vehicle.

More specifically, the present disclosure relates to methods, systems and computer program products for estimation of the road surface condition under a vehicle.

BACKGROUND OF THE INVENTION

Modern cars comprise electronic control systems or vehicle handling systems like traction control system (TCS), Electronic Stability Program (ESP), active suspension system or Anti-lock braking system (ABS). Besides these active control systems there also exist vehicle driver safety information systems such as road friction indicators and sensor-free tire pressure monitoring system, e.g. indirect tire pressure monitoring system (iTPMS), which present information about the driving condition to the driver.

All the above-mentioned systems benefit from the knowledge about a large set of estimated or measured vehicle properties parameters such as tire air pressure, tire longitudinal stiffness, ambient temperature, tire temperature, wheel resonance frequency, carried vehicle load, tire radius change while cornering and wheel vibration dependent on speed.

Knowledge about actual road surface conditions (also referred to as quality of a road) is of interest. Road surface condition information, e.g., about certain road sections can be useful for, e.g., authorities such as the department of transportation for maintenance purposes, travelers who want to plan their route and find the most comfortable way to get from point A to point B.

For example, on the basis of road surface condition information it is possible to detect road surface anomalies that, when left unreported, can cause wear of vehicles, lesser driving comfort and vehicle controllability, or an accident.

Also, knowledge on road surface conditions can be used for electronic control systems of vehicles. Modern vehicles comprise electronic control systems like anti-lock-braking systems (ABS), dynamic stability systems, anti-spin systems and traction control systems. Besides these active control systems there also exist driver safety information systems such as road friction indicators and sensor-free tire pressure monitoring systems which present information about the driving condition to the driver. Such systems may benefit from knowledge about road surface conditions under the vehicle in order to take into account the current actual surface condition of a road a vehicle is presently moving (or will do so) to optimize system performance (e.g. adapt brake forces and/or intervals). For example, in vehicles with an active damping system, information on the road surface condition can be used to pre-set/adjust the stiffness of the suspension. In this way travelling over short segments of the road considered as rough by the driver, gravel road, potholes, speed bumps, "sleeping policemen" or the like can be made more comfortable for the driver/passengers and less damage can be caused to the vehicle in question.

Known approaches to obtain information on road surface conditions utilize smartphone-based applications employing GPS information, images taken by vehicle-mounted cameras and laser sensor scanning the road surface. Such approaches require additional components that normally are not part of a vehicle.

SUMMARY OF THE INVENTION

The object of the present invention is to provide information on road surface conditions, in an improved manner and obtained by means of components already comprised in vehicles.

A further object of the invention is to provide improved detection of short term irregularities of a road under a driving vehicle, such as potholes, speed bumps or other short segments of the road considered as rough by the driver.

In view of the above object, the present invention provides methods, systems and computer program products according to the independent claims. Preferred embodiments are defined in dependent claims.

Generally, the objective of methods, systems and computer program products of the present disclosure is to collect and distribute up-to-date road surface condition information in order to, for example, improve traffic safety.

The collected information may be distributed from a vehicle to a central server and/or other vehicles via a communications network. To this end, for example, it is possible to use a car-to-infrastructure system, a car-to-car system, or any other assistance system that enables direct communication of information between vehicles and/or between a vehicle and a traffic infrastructure operator, over a communications network.

The vehicle may be used as a probe and the road surface condition information is calculated based on information collected by sensors in the vehicle. Specifically, this means that the vehicle may be able to tell other vehicles or road users about road surface conditions and the traffic situation based on information it has collected with its own sensors. Such information can be also provided to traffic infrastructure.

Embodiments of the invention solve the problem of how to detect road surface anomalies that, when left unreported, can cause wear of vehicles, lesser driving comfort and vehicle controllability, or an accident. Road surface conditions that can be detected include, but are not limited to, rough-road/gravel road, potholes, "sleeping policeman", speed bumps and other short segments of the road considered as rough by the driver.

The methods, systems and computer program product embodiments of the present invention are advantageous in that no additional sensors need to be installed inside the vehicle in order to determine the road surface condition. Furthermore, when the road surface condition is known in advance to the vehicle the setting of any active suspension system can be set accordingly.

Information relating to the determined road surface condition may be fused with other road surface condition information, on the backend of a cloud based service and/or central driver assistance system being connected to a car-to-infrastructure system, a car-to-car system, or any other driver assistance system that enables direct communication of information between vehicles and/or between a vehicle and a traffic infrastructure operator, over a communications network, to build up a map or other description of the current road condition.

Other features are inherent in the methods and systems disclosed or will become apparent to those skilled in the art from the following detailed description of embodiments and its accompanying drawings.

DESCRIPTION OF THE DRAWINGS

Embodiments of the invention will now be described by way of example and with reference to the accompanying drawings, in which.

DETAILED DESCRIPTION

Figure 1A:
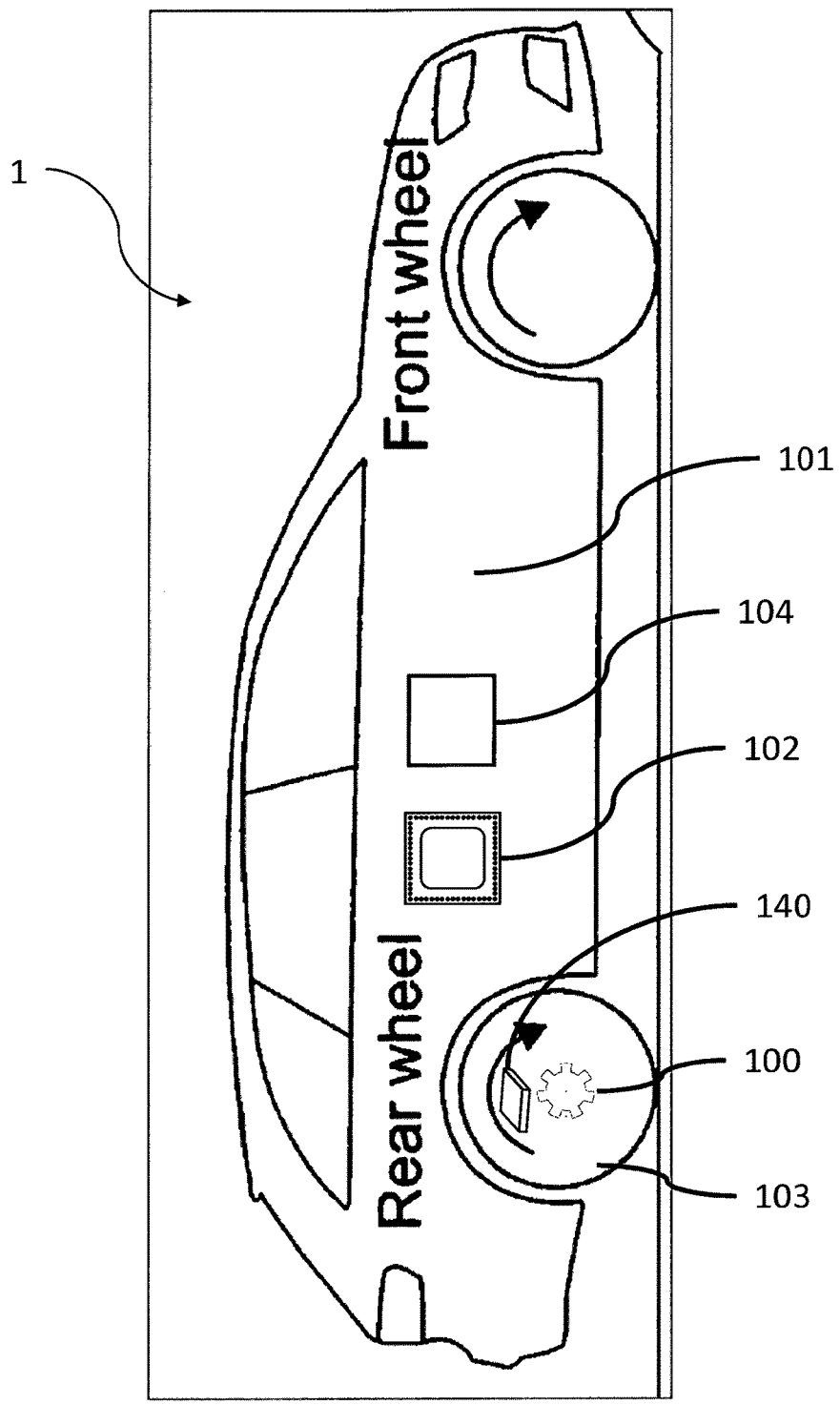
FIG. 1A is a schematic view of a system, according to embodiments, comprising a vehicle driving on a road with a surface disturbance ("bump")

Thus, a general purpose of the present invention is to provide improved methods and apparatuses, which enable to more accurately determine a ground condition through detection of short term irregularities, by means of combining sensor signals obtained from sensors already present in a vehicle.

According to the present invention, short term irregularities in a road under a vehicle are detected using information from one or more sensors indicative of time dependent oscillations at least a first wheel of the vehicle and information from one or more sensors indicative of a time dependent vertical movement of the vehicle chassis.

In general, detecting short term irregularities under a driving vehicle and possibly also determining the road surface condition under a driving vehicle can be based on combining, on the one hand, sensor data indicative of the time dependent behavior of oscillating signals at a wheel on the one hand (e.g. oscillations in wheel speed signals) of a vehicle's wheel in response to a current road surface (e.g. road bumpiness or unevenness) and, on the other hand, sensor data indicative of the time dependent vertical movement of the vehicle chassis (e.g. distance between a wheel axle and the chassis or a specified point on the wheel and the chassis).

Through such combination of information short term irregularities in the road surface can be detected. For example, such an information combination enables to detect sensor data's short term irregularities having smooth edges, rather than sharp edges. Furthermore, the present invention also improves detection of short term irregularities having sharp edges.

The cause for variations of the time dependent behavior of oscillation signals may be any road feature. Road features can be considered as parts of the surface of or on a road and include, e.g. pot-holes, asphalt texture, small stones, bumps etc. Such road features induce tire oscillations via the tire-road contact. Variations, which are induced at a particular wheel, result in a specific time dependent behavior of the respective sensor signal(s). For example, instantaneous wheel speed signals measured by one or more sensors at a wheel are influenced by the road features, which were passed to that wheel.

Wheel speed signals may be obtained using one or more wheel speed sensors of, for example, ABS systems and/or from the vehicle's internal CAN/Flex Ray-bus and/or any suitable vehicle sensor, preferably already part of vehicles.

Information relating to a determined road surface condition for a vehicle may be fused with other road surface condition information from one or more other vehicles and/or from a cloud based service system in the form of a car-to-infrastructure system, a car-to-car system, or any other driver assistance system that enables direct communication of information between vehicles and/or between a vehicle and an infrastructure operator, over a communications network. This allows to obtain more precise road surface condition information on a specific road (or a section thereof), get an overview on road surface conditions in a geographical area and/or build up a map of the current road-condition. Also, such a collection of road surface condition information from, different vehicles may be used to determine how a certain road surface condition influences the driving behavior of different vehicle types.

To collect road surface condition information from one or more vehicles, the information from the vehicle(s) can be communicated to other vehicles or infrastructure operators via a backend of a cloud based service system in the form of a car-to-infrastructure system, a car-to-car system, or any other driver assistance system enabling communication of information between vehicles and/or between a vehicle and an infrastructure operator, over a communications network. In any case, such communication can be direct and/or performed in real time.

Information relating to the determined road surface condition from a vehicle, taken alone or fused with other road surface condition information, may be processed by a cloud based service system and/or central driver assistance system in the form of a car-to-infrastructure system, a car-to-car system, or any other driver assistance system enabling direct/real time communication of information between vehicles and/or between a vehicle and an infrastructure operator, over a communications network and/or a processor or evaluator of the vehicle. For example, the evaluator of a vehicle may adjust settings of the vehicle, for example, any active suspension settings.

FIG. 1A shows a schematic view of a system 1, comprising a vehicle 101, here in the form of a vehicle with four wheels 103, driving on a road with a surface disturbance ("bump"). The vehicle comprises a first sensor 100, configured to determine a first sensor signal indicative of time dependent oscillations at a first wheel of the vehicle, and a second sensor 140, configured to determine a second sensor signal indicative of a vertical movement of the vehicle chassis. The first and seconds sensors 100 and 140 are configured to measure and communicate measurement data as sensor signals to a processor or evaluator 102. The processor or evaluator 102 is further configured to receive the first sensor signal and the second sensor signal; and detect any short term irregularity in the road surface present under the driving vehicle based on the first sensor signal and the second sensor signal.

The evaluator or processor 102 may be any type of processing unit, such as a general or special purpose processing engine such as, for example, a microprocessor, microcontroller or other control logic or an FPGA unit (Field-Programmable Gate Array) that comprises sections of code, stored on a computer readable storage medium, that are fixed to perform certain tasks but also other sections of code, stored on a computer readable storage medium, that can be altered during use. Such alterable sections can comprise parameters that are to be used as input for the various tasks, such as the setting of active suspension parameters, among others. Preferably, the evaluator or processor 102 is comprised in a central control device or unit of the vehicle, for example, in the form of integrated hardware, firmware and/or additional software.

Since the present invention preferably employs already present sensors of a vehicle, it is possible to add the road surface condition determination according to the present invention in form of additional software or firmware applications or add-ons for a vehicle's already present control device/unit.

The vehicle may be any wheeled vehicle, like a car, a lorry, a truck, a motorcycle, a bike, a train, etc. which have at least one wheel in contact with the ground. Thus, even a vehicle (bike, motorcycle) driving on just one wheel can benefit from the present invention.

Figure 1B:
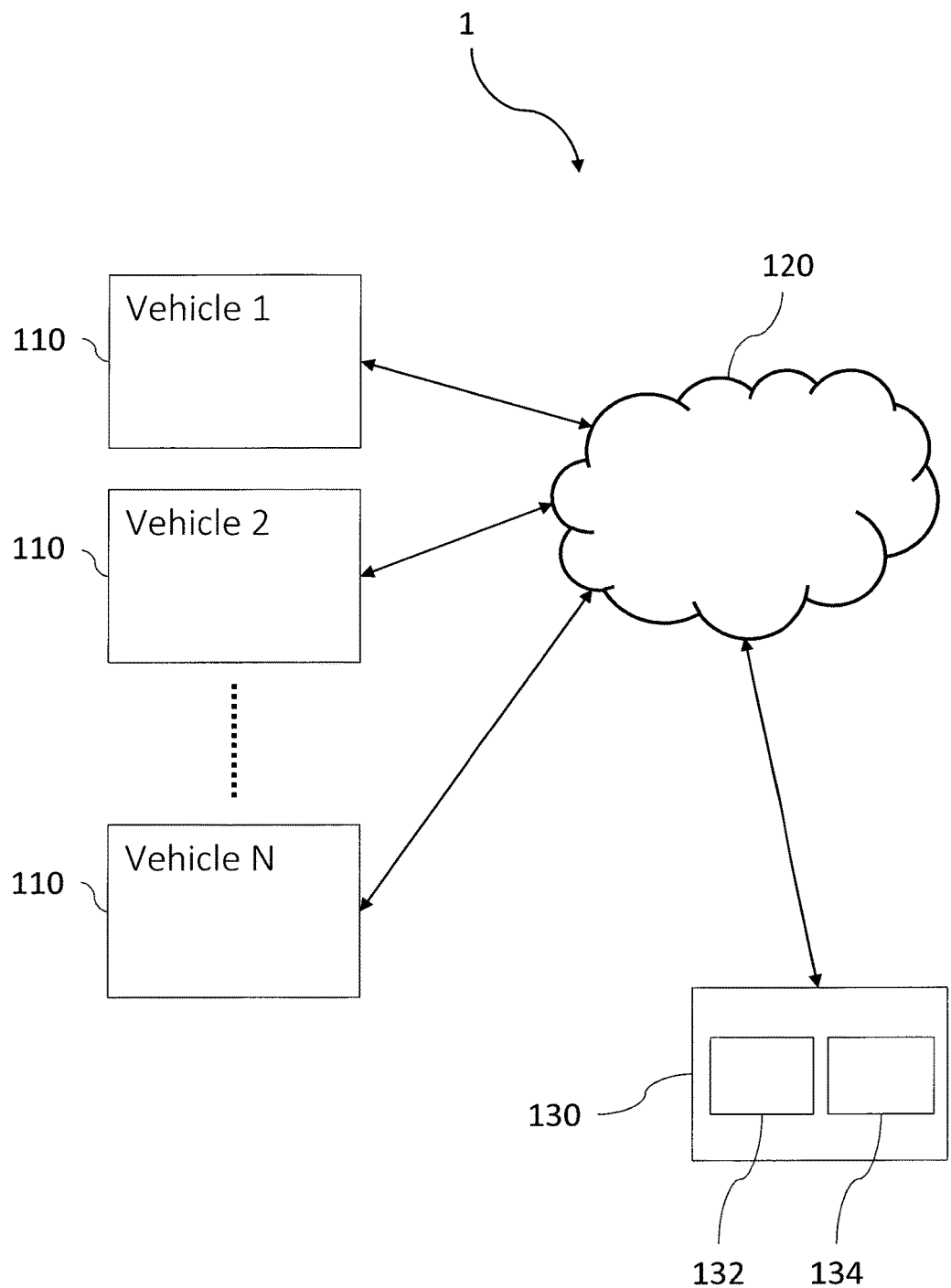
FIG. 1B is a schematic view of a system, according to embodiments, comprising one or more vehicles, a communications network and a central system backend unit.

FIG. 1B shows a schematic view of a system 1, comprising one or more vehicles 110, corresponding to the vehicle 101 of FIG. 1A, and further comprising a communications network 120 and a central system backend unit 130 having an evaluator or processor 132.

As indicated by the bidirectional arrows, the one or more vehicles 110 are arranged to communicate information with any one of the other one or more vehicles 110 and/or with the central system backend unit 130 via the communications network 120. Such information may include, but is not limited to, information on road surface conditions, such as information on detection of one or more short term irregularity; other up to date road surface condition information to be used for updating of a current road surface condition description; a map or other description of the road surface condition; or a control signal for example triggering an alarm that is perceptible to a driver of a vehicle in the form of for example graphics and/or audio, the alarm relating to a detected short term irregularity.

Preferably, the one or more vehicles 110 are used as "probes". The processor or evaluator 102 of each vehicle is arranged to calculate road surface condition information based on information collected by sensors in the vehicle, for example sensors 100 and 140, but possibly also other sensors present in the vehicle. Specifically, this means that every vehicle may be able to tell other vehicles/road users about road surface conditions and the traffic situation based on information it has collected with its own sensors. The collected information of a vehicle may be distributed from any or all of the one or more vehicles to a central server, exemplified in FIG. 1B by the central system backend unit 130, and/or other vehicles 110 via a communications network. The distribution via the communications network may be enabled using a cloud based service system in the form of a car-to-infrastructure system, a car-to-car system, or any other driver assistance system enabling communication between driving vehicles and/or between a driving vehicle and a traffic infrastructure operator can be used. In any case, such communication can be direct and/or performed in real time.

The evaluator or processor 102 of the vehicle 110 may be configured to generate or update a map of the current road surface condition based on information on one or more detected short term irregularities. The processor 132 of the central system backend unit 130 may be configured to also receive information on one or more detected short term irregularity from the vehicle(s) 110 via the communications network 120. Such information may be used for data collection purposes, for example. However, such information may be also communicated from the central system back end unit 130 to vehicle(s) 110. This enables providing a vehicle 110 with information on short term irregularities collected by one or more other vehicles 110; then, the evaluator/processor 102 may be configured to use the information on short term irregularities from the vehicle 110 it resides in and/or such information collected by one or more other vehicles 110 to generate or update a map of the current road surface condition.

However, in addition or as an alternative, the evaluator/processor 132 of the central system backend unit 132 may (also) be configured to generate or update a map of the current road surface condition based on information on one or more detected short term irregularities. To this end, the evaluator/processor 132 may use information for one or more vehicles 110 to generate/update a map of a current road surface condition for the area/roads where that vehicle is, or these vehicles are, respectively, located. However, the evaluator/processor 132 may use information from all vehicles 110 to generate/update a map of current road surface conditions for the whole area and all roads, respectively, where vehicles 110 being in communication with the central system backend unit 130 are located/moving.

The evaluator or processor 102, and/or the processor 132 of the central system backend unit 130 may further be configured to generate or update a classification of the road surface based on one or more detected short term irregularities. The evaluator or processor 102 and/or the processor 132 of the central system backend unit 130 may further be configured to perform the classification update in real time. The evaluator or processor 102 may further be configured to adjust the settings of the active suspension of the vehicle based on the updated classification that is calculated by the processor or evaluator 102 and/or calculated by the processor 132 of the central system backend unit 130 and received from the central system backend unit 130. As regards a generation/updating of a road surface classification, like in the above cases of a generation/updating of road surface condition maps, information on short term irregularities from one or more vehicles 110 may be used. The above description correspondingly applies here.

The present invention may be used as a driver assistance system, providing up to date road surface condition information to a driver of a vehicle, and/or as an infrastructure assistance system, providing up to date information road surface condition information to organizations in charge of traffic control, infrastructure or road maintenance, just to give a few non-limiting examples.

The sensor used to obtain the first sensor signal may be of any sensor type which is responsive to time dependent oscillations of a wheel of the vehicle. For example, the first sensor may be a common wheel speed or acceleration sensor for all wheels of a vehicle, at least one individual wheel speed or acceleration sensor associated to a single wheel. The first sensor may comprise two or more sensor types, for example, a wheel speed sensor and a wheel acceleration sensor.

As illustrated, the first sensor may be a wheel speed sensor 100, wherein the first sensor signal is a wheel speed signal indicative of the time dependent behavior of the speed, or wheel speed oscillations, of the wheel 103 of the vehicle. For example, the wheel speed sensors of an antilock braking system (ABS) are used. This is advantageous since such ABS-sensors are already mounted in all vehicles today. Wheel speed sensors are well known to the person skilled in the art.

Figure 2:
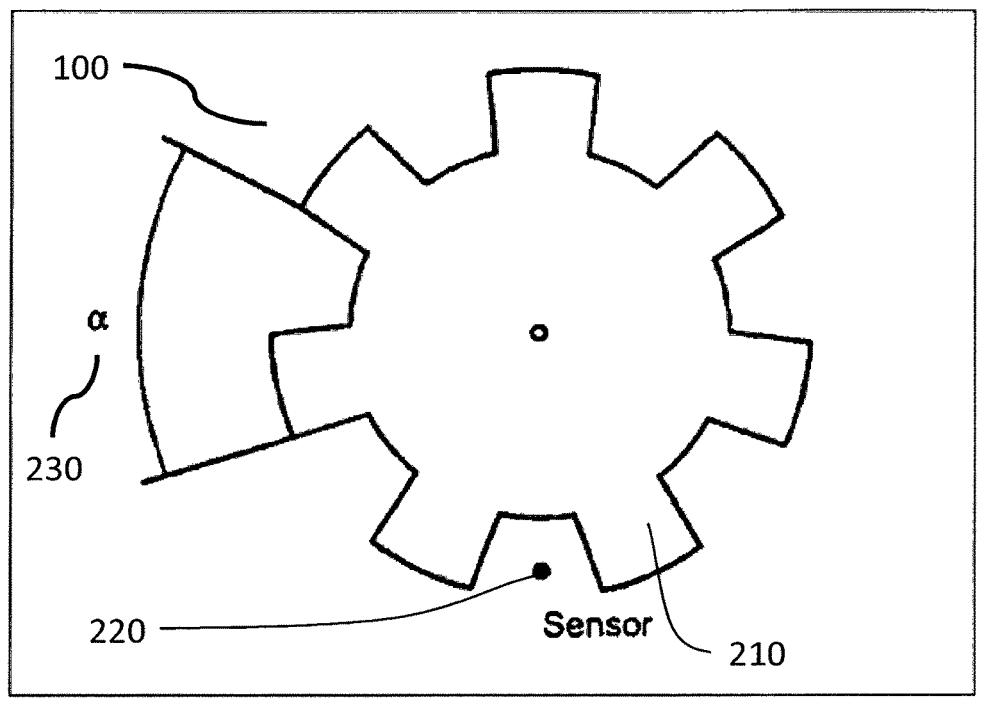
FIG. 2 is a schematic view of an embodiment of a wheel speed sensor.

FIG. 2 shows a schematic diagram of an exemplary wheel speed sensor 100 comprising a toothed wheel 210 with, e.g., seven identical teeth. A sensor component 220 is located and arranged such to generate a sensor signal whenever a tooth (cog) of the toothed wheel passes the sensor component 220. The sensor component 220 may be an optical sensor, a magnetic sensor (e.g. a HALL sensor) or any other conceivable type of sensor. The sensor component 220 produces electrical signals which are transported by wires or radio transmission to a subsequent processor or evaluator unit (e.g. the evaluator/processor 102 of FIG. 1A) for further processing. In the example of FIG. 2, there are in total seven sensor signals generated during one complete revolution of the toothed wheel.

The vehicle's processor or evaluator 102 may be configured to determine time dependent vibrations or wheel speed oscillations using a matched filter, as further described in connection with the method embodiments.

By introducing a second sensor signal indicative of a vertical movement of the chassis, and combining it with the first sensor signal indicative of wheel speed oscillations (time dependent vibrations of the wheel), a more reliable detection of short term irregularities in the road surface under a driving vehicle is achieved. Thus, a sensor fusion approach is applied in order to improve the detection performance at the same time as minimizing the number of false indications.

For example, as illustrated, the second sensor may be an axle height sensor arranged to determine a distance between the wheel axle of a wheel of the driving vehicle and the vehicle chassis. The axle sensor may measure the axle height at different time instances, for example at predetermined successive time intervals, thereby providing a sensor signal indicative of a time dependent distance between the wheel axle of the first wheel and the vehicle chassis.

In addition or as alternative, the second sensor may be an air suspension height sensor and/or one air suspension height sensor associated with each of the one or more wheels of the vehicle arranged to determine a time dependent distance between, on the one hand, the associated wheel or associated wheels and, on the other hand, the vehicle chassis. The air suspension height sensor may perform measurements at different time instances, for example at predetermined successive time intervals, thereby providing a sensor signal indicative of a time dependent distance between the associated wheel, or associated wheels, and the vehicle chassis.

In addition or as alternative, the second sensor may be a vertical accelerometer, located e.g. in a suspension system of the vehicle.

The second sensor may comprise two or more sensor types, for example, at least one axle height sensor and/or at least one air suspension height sensor and/or at least one vertical accelerometer.

With respect to wheel acceleration, any sensor(s) capable to determine the acceleration of a wheel can be used.

The information from the second sensor may include information from at least one of one or more axle height sensors; one or more air suspension height sensors; and one or more accelerometers, which may be combined to generate an improved second sensor signal.

A detection of short term irregularities of/on a road surface can be made by utilizing information from sensors coupled to the wheel speed of a driving vehicle as well as information from sensors coupled to the vertical movement of the chassis of the driving vehicle, as explained in the following.

When one of the tires of a driving vehicle travels across a short term irregularity on/of the road, such as short segments of the road considered as rough by the driver, gravel road, pot-holes, speed bumps, "sleeping policeman" or the like, having more or less distinct edges, this gives a vertical impulse to the tire. Due to the spring properties of the tire and the suspension system, the impulse causes an oscillation, with a pronounced resonance around 15 Hz. The oscillation affects the individual wheel speed and can for instance be observed when looking at the difference in time between two registrations of a wheel speed sensor, as described in connection with FIG. 2. Thereby, a way to detect the tire oscillations that occurs when passing over a short term irregularity on/of the road surface is to look at the variance of the difference in time between two cog registrations during the length of a predetermined time interval, for example but not limited to 100 ms. The variance of the difference in time between two cog registrations can be estimated as:

$$\sigma^2 = \frac{1}{n}\sum_{k=1}^{n}(t_k - t_{k-1} - \mu)^2 \quad \text{(Eq. 1)}$$

where μ is the expected value and $\sigma^2$ is the variance of Δt.

To compute the variance $\sigma^2$ of the difference in time between two registrations of a wheel speed sensor for the predetermined time interval, the expected value may be estimated. Due to changes in velocity during the predetermined time interval, the expected value of the variance of the difference in time between two registrations will change during the time interval. To compensate for this, the expected value of the variance of the difference in time between two registrations can be approximated, for example, as a linear trend over the time interval, as illustrated by FIG. 4A.

Figure 4A:
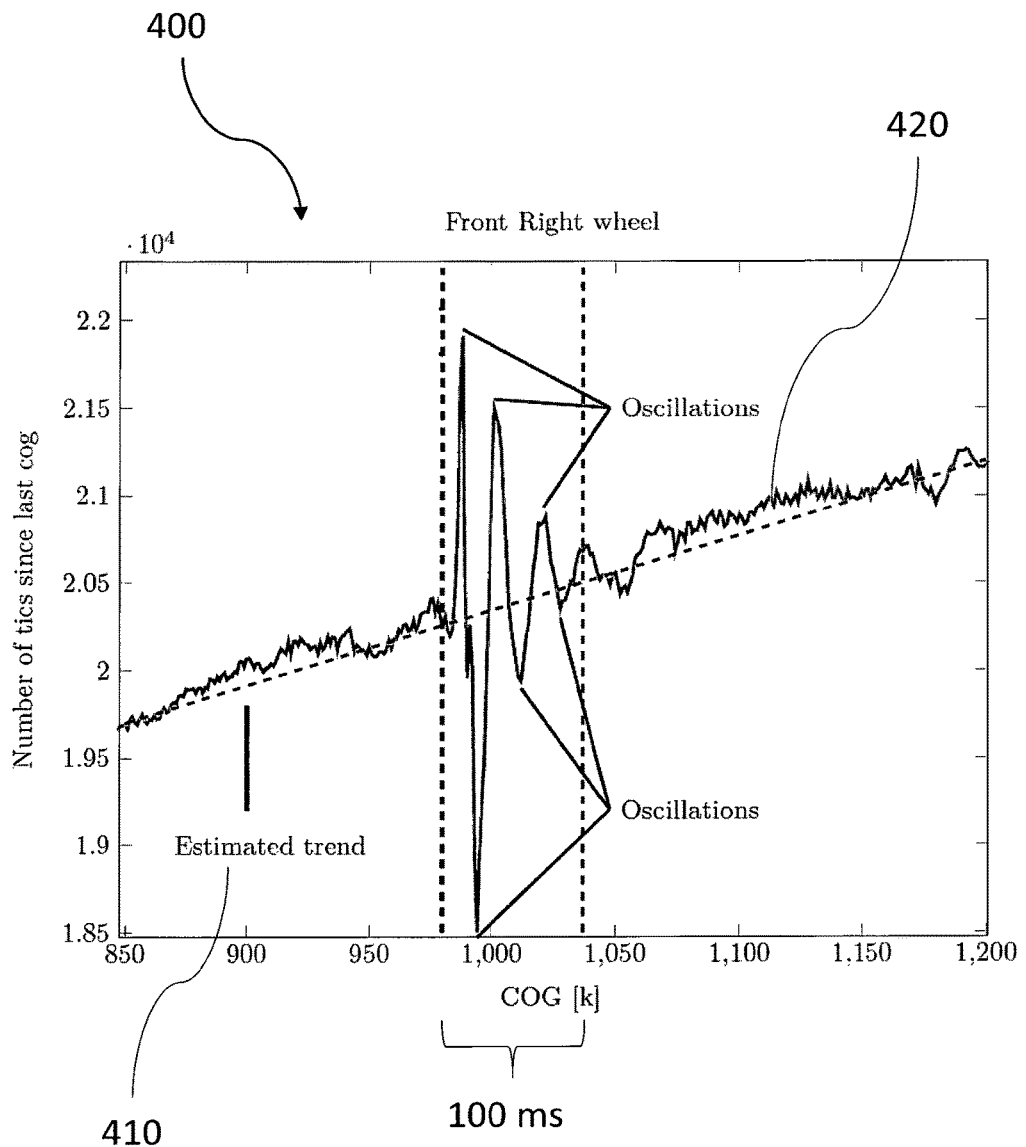
FIG. 4A is a plot showing measurements of how the difference in time between two registrations oscillates around the linear estimated trend for a wheel of a driving vehicle according to an embodiment.

FIG. 4A shows a plot 400 showing measurements 420 of how the difference in time between two registrations oscillates around the linear estimated trend 410 for a wheel of the driving vehicle, here exemplified as the front right wheel of a vehicle having four wheels. In the plot 400, a time interval of 100 ms is marked-up, wherein oscillations have significantly larger amplitudes than oscillations outside the indicated time interval. Such high(er) amplitude may be indicative of a short term irregularity on/of the road surface of the road under the driving vehicle, and may be compared to a threshold to determine detection of a short term irregularity, as discussed further in connection with FIG. 4B.

The linear trend of the variance of the difference in time between two registrations can in embodiments be written as:

$$y_k = \varphi_k^T \theta + e_k \quad \text{(Eq. 2)}$$

where $y_k$ is the k'th measured difference in time between two registrations of a wheel speed sensor during the predetermined time interval, $\varphi_k^T = [k, 1]$, $\theta = [a, b]^T$ are the slope and the offset, respectively, of the linear trend, and $e_k$ is a noise term.

The least squares solution to Eq. 2 is:

$$\hat{\theta} = (\Sigma_{k=1}^n \varphi_k \varphi_k^T)^{-1} \Sigma_{k=1}^n y_k \varphi_k \quad \text{(Eq. 3)}$$

The estimated slope and offset of the linear trend can be derived to the following expressions:

$$\hat{a} = \frac{1}{n \sum_{k=1}^n k^2 - \left(\sum_{k=1}^n k\right)^2} \left( n \sum_{k=1}^n k \cdot y_k - \sum_{k=1}^n k \sum_{k=1}^n y_k \right) \quad \text{(Eq. 4)}$$

$$\hat{b} = \frac{1}{n \sum_{k=1}^n k^2 - \left(\sum_{k=1}^n k\right)^2} \left( \sum_{k=1}^n k^2 \sum_{k=1}^n y_k - \sum_{k=1}^n k \sum_{k=1}^n k \cdot y_k \right) \quad \text{(Eq. 5)}$$

After the linear trend has been estimated for the current preselected time interval, the variance $\sigma^2$ of the difference in time between two registrations can be calculated as described in Eq. 1.

The variance $\sigma^2$ may then be compared with a predetermined threshold value, set for example in production of the vehicle or during calibration of the vehicle data gathering and calculation systems.

The threshold value may be set to a level that corresponds to a variance $\sigma^2$ of the difference in time between two registrations that is indicative of a short term irregularity on the road surface. Starting therefrom, if the variance $\sigma^2$ is higher than the preset threshold, this is an indication of a short term irregularity under the driving vehicle and the processor or evaluator 102 (and/or processor 132) may be configured to determine the presence of, or in other words detect, a short term irregularity under the vehicle if the variance $\sigma^2$ is above the predetermined threshold value.

Figure 4B:
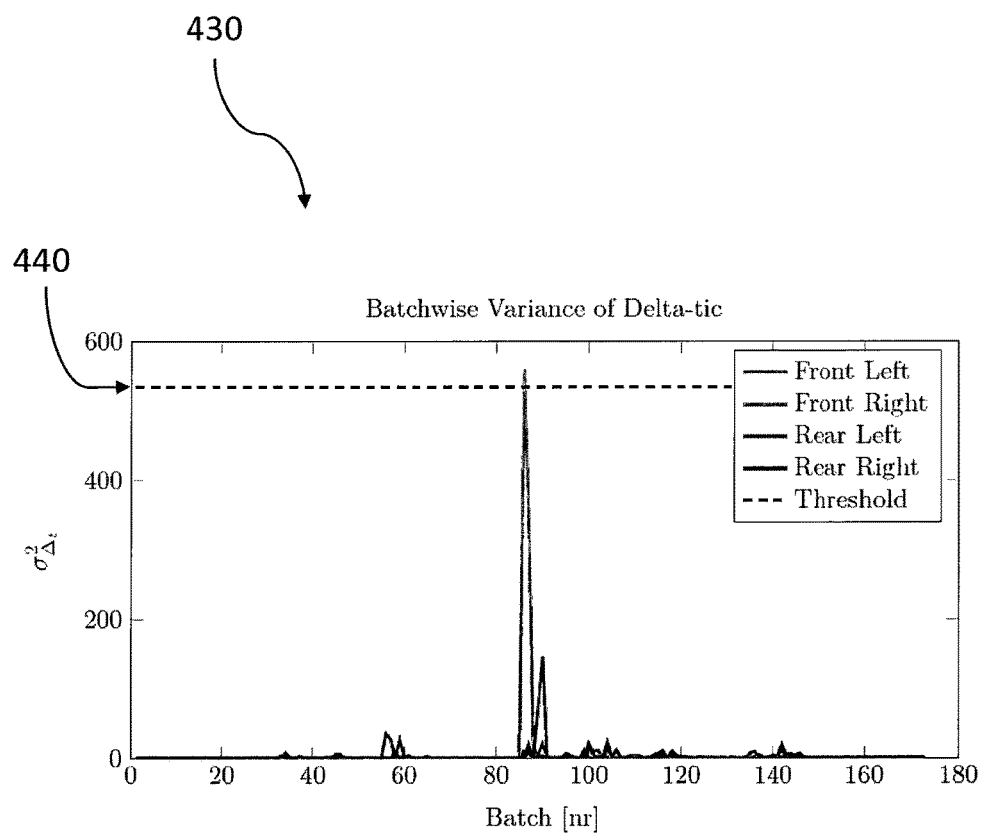
FIG. 4B is a plot showing a variance of the difference in time between two registrations of a wheel speed according to an embodiment.

In the plot 430 shown in FIG. 4B, a variance of the difference in time between two registrations of a wheel speed, indicated by an amplitude value in the y-direction, for every "batch", as indicated on the X-axis, wherein a "batch" corresponds to a predetermined time interval. In FIG. 4B, a threshold value 440 indicating the presence of a short term irregularity is indicated by a dotted line. As can be seen from FIG. 4B, there is a distinct peak, with n amplitude exceeding the threshold value, and a smaller peak in close succession. In this example, this originates from a front wheel hitting the irregularity first and a corresponding rear wheel hitting the same irregularity shortly thereafter. The difference in magnitude between the variance of the front and rear wheel is in this case due to the uneven weight distribution of the vehicle that here is assumed to have its engine in the front. The smaller weight on the rear axle will not force the rear wheel to fall down into the road irregularity to the same degree as the front wheel, and the impulse for the rear wheel will therefore be smaller.

A matched filter may be used for detecting the presence of a short term irregularity under a driving vehicle is shown. This may comprise comparing a predetermined template signal, representative of wheel speed oscillations, e.g. around 15 Hz, that occur when driving over a short term irregularity on a road surface, to a signal representing the measured or calculated wheel speed oscillations of a driving vehicle; and further determining a detection of a short term irregularity if the measured or calculated signal correlates to a high degree (over a preset threshold value) with the template signal. The matched filter may for example be written as a convolution:

$$y_{MF}(t) = (h*x)(t) = \Sigma_k h(k) x(t-k) \quad \text{(Eq. 6)}$$

where h is the template signal searched for and x is the input (measured/calculated) signal.

h may be chosen to be the impulse response to a band pass filter around a frequency representing the energy of an oscillation caused by a predetermined short term irregularity.

A decision quantity for the matched filter signals may be generated by means of taking the square and low pass filtering the output:

$$y_{LP}(t) = LP(y^2(t)) \quad \text{(Eq. 7)}$$

Figure 4C:
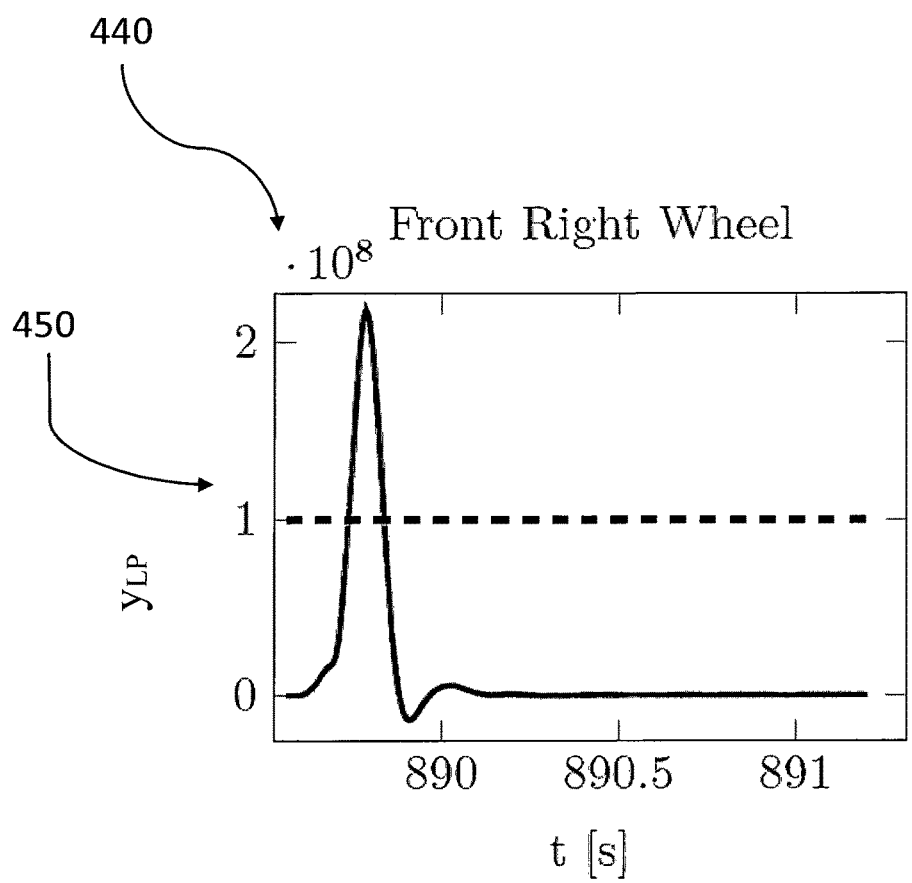
FIG. 4C is a plot showing an example of decision quantities.

Examples of such decision quantities are shown in FIG. 4C, having a normalized low pass threshold value 450. In FIG. 4C, the exemplifying plot 440 shows a signal derived from a wheel speed sensor of the front right wheel of a vehicle with four wheels. According to this illustration, when the threshold value 450 is exceeded, this indicates the detection of a short term irregularity on/to the road surface under the driving vehicle. The detection may trigger an alarm perceptible by the driver of the vehicle, e.g. as any type of visual/audible/sensible output.

Any matching filter function known in the art and suitable for comparison of two signals, not only the one used as an example herein, are possible to use in matching filter embodiments.

To complement the information from the wheel speed signals, information about the vertical movement of the chassis over time may be further used, in other words fusing sensor information relating to time dependent oscillations of a wheel with time dependent vertical movement of the chassis. Driving over an irregularity on/of the road surface implicates an energy in the suspension system that is observable in sensor signals measuring the heights between each wheel or wheel axle and the vehicle chassis. These signals can be particularly useful for detecting irregularities that do not have sharp edges that creates large oscillations in the wheel speed signals.

Furthermore, another benefit of a sensor fusion approach is to minimize the number of false indications. During dynamic driving, for example at heavy accelerations and gear shifting, the pitch angle of the vehicle might change rapidly resulting in a possible false indication when using only signals indicative of the vertical movement of the chassis. In combination with the information from the wheel speed sensor, such false indications can be suppressed. Additionally, false indications caused by disturbances outputted from the wheel speed signals—not related to short term road irregularities—may then also be suppressed by using sensor fusion with the sensors measuring the vertical movement of the chassis.

Figure 5A:
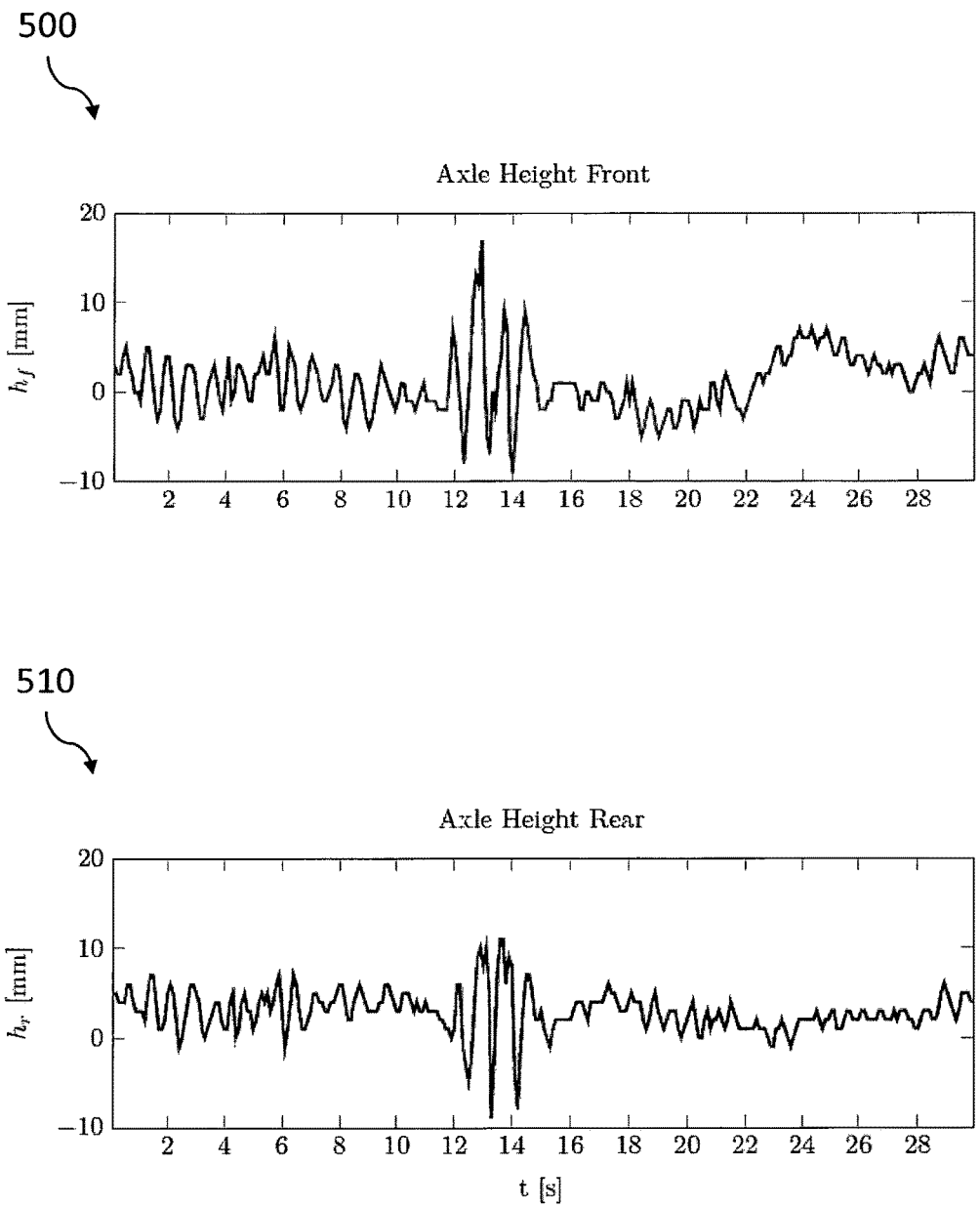
FIG. 5A shows two plots of example axle height signals obtained using a front and a rear axle height sensor when driving over a short term irregularity.

FIG. 5A shows two plots 500, 510 of example axle height signals obtained using a front and a rear axle height sensor when driving over a short term irregularity on the road surface under the driving vehicle.

The moving variances for the axle height signals may be calculated to get an additional indicator for short term irregularities. The variances could be calculated as:

$$\sigma_{h_a}^2 = LP(h_a^2) - (LP(h_a))^2 \quad \text{(Eq. 8)}$$

where $h_a$ is the axle height for axle a and $\sigma_{h_a}^2$ is the moving variance of $h_a$.

Figure 5B:
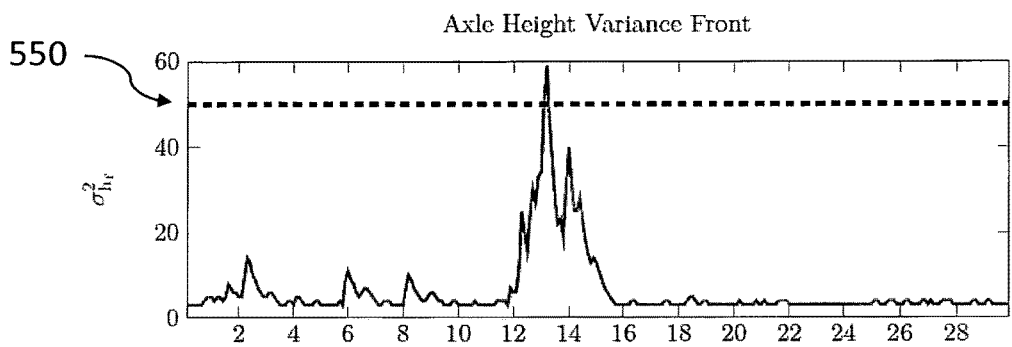
FIG. 5B shows plots representing the variances of the axle height signals in FIG. 5A.
Figure 5B:
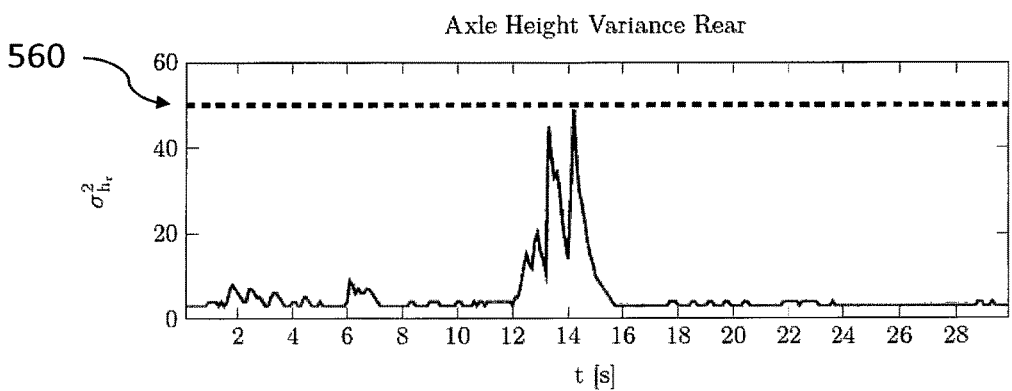

FIG. 5B shows plots 530 and 540 representing the variances of the axle height signals in FIG. 5A. In method embodiments, the variance of an axle height signal is compared to a predetermined threshold, in FIG. 5B exemplified by the dotted lines 550, 560, and it is determined that a short term irregularity on the road surface under a driving vehicle is detected if the variance value of the axle height signal exceeds the preset limit value.

Axle height signal variance values may be updated if the absolute value of the longitudinal acceleration is within preset limits. This reduces or removes fluctuations in the pitch angle, which occur due to load transfers at high acceleration and sudden braking. As described herein, in an example, axle height variance information from an axle height sensor may be combined with wheel speed information, e.g. from a wheel speed sensor or wheel acceleration sensor, in order to obtain improved information (sensor fusion information) on which basis short term irregularities on the road surface under the driving vehicle can be detected.

Figure 3:
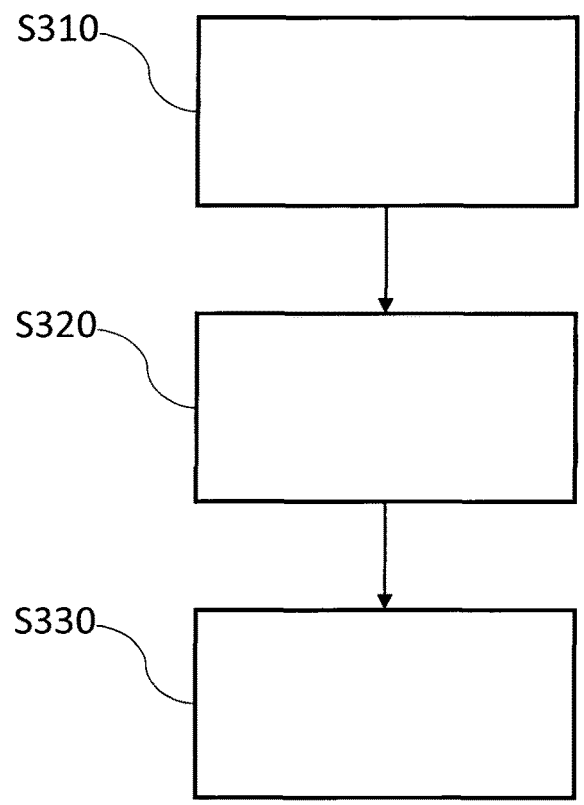
FIG. 3 is a flow diagram of a method according to embodiments.

FIG. 3 shows a flow diagram of embodiments of a method for detecting a short term irregularity under a driving vehicle having at least a first and a second wheel, the method comprising:

In step S310: determining a first sensor signal indicative of time dependent oscillations at the first wheel, using a first sensor.

The first sensor signal may be at least one of
a wheel speed signal indicative of the time dependent behavior of the speed of the first wheel of the vehicle, for example wheel speed oscillations;
a signal from an accelerometer, located e.g. in a suspension system of the vehicle;

Time dependent oscillations of the first sensor signal may be determined based on at least one of calculations of the variance of the time between two successive internal signals of the first sensor, as described in connection with FIGS. 4A-4C, and determining the time dependent oscillations comprises using a matched filter, as described in connection with FIG. 4C.

For a vehicle having at least one wheel pair comprising a front and a rear wheel and wheel speed signals obtained at the respective wheel of the wheel pair are correlated, a correlation peak will occur at the time of the oscillations from passing the short term irregularity o/of the road surface under the driving vehicle. If the distance between the front and rear axle of the vehicle is known, the wheel correlation can be used for determination of the vehicle speed, for example, as described in the related art document WO 2011/054363 A1.

Any or all of the embodiments under Step S310 may further be combined to obtain even more accurate information on the time dependent oscillations.

In step S320: determining a second sensor signal indicative of a time dependent vertical movement of the vehicle chassis, using a second sensor.

Determining a time dependent vertical movement of the vehicle chassis may comprise at least one of:

determining a time dependent distance between the wheel axle of the first wheel and the vehicle chassis, using an axle height sensor, as described in connection with FIGS. 5A and 5B;

determining a time dependent distance between each of the at least two wheels of the vehicle, respectively, and the vehicle chassis, using a respective air suspension height sensor associated with each of the at least two wheels;

determining vertical acceleration using a vertical accelerometer.

Any or all of the embodiments under Step S320 may further be combined to obtain even more accurate information on the time dependent vertical movement of the chassis.

In step S330: detecting any short term irregularity under the driving vehicle based on the first sensor signal and the second sensor signal.

The detection step S330 may comprise comparing a value derived from a combination of the first and the second sensor signals to a predetermined threshold value in order to determine detection of a short term irregularity on the road surface under a driving vehicle.

The detection step S330 may comprise:
generating a normalized first sensor value, first_sensor_value$_i$, based on a sensor signal obtained using the first sensor at time $t_i$;
generating a normalized second sensor value, second_sensor_value$_i$, based on a signal obtained using the second sensor at time $t_i$;
calculating a total output value E based on the normalized first_sensor_value$_i$ and the normalized second_sensor_value$_i$; and
comparing the total output value E to a preset threshold; and
determine:
if the total output value E exceeds the preset threshold, that a short term irregularity is present under the driving vehicle; or
if the total output value E does not exceed the preset threshold, that no short term irregularity is present under the driving vehicle.

The sensor fusion determination may be performed every time the first and second sensors perform measurements, as indicated above using the time notion $t_i$.

Alternatively, the sensor fusion determination may be performed only when a measured sensor value from the first or the second sensor is found to exceed a preset threshold at a specified time instance $t_1$, whereby the total output value E is calculated and compared to the preset threshold only when one of the first and second sensors have provided an indication that a short term irregularity may be present under the driving vehicle. In this case, if the total output value E is found not to exceed the preset threshold value, this corresponds to a "false alarm", since one of the first and second sensor has registered a value that, when taken alone, indicated the detection of a short term irregularity on the road surface under the driving vehicle. In other words, the use of sensor fusion, fusing information from two or more sensors, provides more accurate detection of short term irregularities than using information from a single sensor only.

The first sensor value may be normalized through multiplication with a first constant K1, and the second sensor value may be normalized through multiplication with a second constant K2. The values of K1 and K2 may be preset and determined in production, in calibration, and/or stored in and retrieved from a data storage 104 integrated in a vehicle 1, as illustrated in FIG. 1A, or a data storage accessible to the vehicle 1, e.g. a data storage 134 of the central system backend unit 130, as illustrated in FIG. 1B. The processor 102, and/or the processor 132, may be configured to retrieve the first and second constants K1 and K2 from a memory 104, 134; normalize the first and second sensor signals using the first and second constants K1 and K2; and generating a total output value E by summing the resulting values of the normalized sensor signals, according to the following equation:

$$E = K1 \cdot (\text{first\_sensor\_value}_i) + K2 \cdot (\text{second\_sensor\_value}_i) \quad \text{(Eq. 9)}$$

The total output value E may correspond to an energy value.

The processor 102, and/or the processor 132, may be configured to: compare the total output value E to a preset threshold; and determine:
- if the total output value E exceeds the preset threshold, that a short term irregularity is present under the driving vehicle; or
- if the total output value E does not exceed the preset threshold, that no short term irregularity is present under the driving vehicle.

The above evaluation may e.g. be performed for the entire vehicle, for each separate wheel, if the vehicle has more than one wheel, or for each wheel pair, if the vehicle has two or more wheel pairs.

The constants K1 and K2 may be updated at parameter download in connection with service of the vehicle, or via download from a communications network, e.g. automatic or user triggered download at predetermined time intervals or in connection with a new system version release. Furthermore, the constants K1 and K2 may also be adapted as a function of the velocity of the vehicles, since the induced energy will change as a function of the speed; the higher the speed, the lower the induced energy.

By combining the information obtained from step S310 and step S320, an improved detection of short term irregularities is obtained. For example, step S310 may be enough to detect a short term irregularity, for example a pot hole, having sharp edges and thereby giving rise to large variations in the wheel speed oscillation, but an irregularity with smoother edges may go unnoticed if for example the amplitude of the oscillations do not exceed a preset threshold.

By combining the information on variations in the wheel speed oscillation with information on oscillations of the chassis, a more accurate determination can be made on whether the oscillations of the wheel speed in fact indicates the presence of a road irregularity or not.

After step S330, information on any detected short term irregularities is obtained. This information may be used for several advantageous purposes.

The method may comprise generating or updating a map of the current road surface condition based on one or more detected short term irregularities.

The method may comprise, in addition or as alternative, updating a classification of the road surface based on one or more detected short term irregularities The method may comprise, in addition or as alternative, performing the above mentioned generating or updating a map of the current road surface condition and/or updating a classification of the road surface in real time.

The method may further comprise, in addition or as alternative, adjusting the settings of the active suspension of the vehicle based on the updated classification.

The method may comprise distributing the updated road surface classification or map using a driver assistance system that is able to communicate directly with each other and/or with the traffic infrastructure operators.

All method steps and functions described herein may be performed in real time, and the calculations and evaluations may be performed by the processor 132 or evaluator 102 of the driving vehicle, or performed by the processor 132 of the central system backend unit 130 and communicated to the processor or evaluator 102 of the driving vehicle.

The processor or evaluator 102 may be configured to determine, in the step relating to the first sensor signal, one sensor signal indicative of time dependent oscillations at a first wheel and further one sensor signal indicative of time dependent oscillations at a second wheel, respectively and correlating the first and second sensor signals in order to determine a correlation signal of the signals obtained at the first and second wheel. If one or more wheel speed sensors are used to measure the oscillations, then the wheel speed signals are preferably measured in a pair of a front and a rear wheel which are running in a lane so that they feel the same road features in a time delayed manner.

The processor of evaluator 102 may be configured to perform any or all of the method steps or functions described herein.

As possible implementation, there is provided a computer program product arranged to, when executed in a computing device, control a processor to perform any or all of the method steps or functions described herein.

The vehicle may comprise a display (not shown in the figures), wherein the evaluator or processor 102 may be configured to control the display and/or acoustic and/or sensible output to output graphic or image, or audio, or sensible data associated with the road surface condition, such as a map of the current road surface condition or upcoming obstacles, or a visual/acoustic/sensible alarm/warning that the vehicle is approaching an obstacle.

Embodiments of computer program products with program code for performing the described methods include any machine-readable medium that is capable of storing or encoding the program code. The term "machine-readable medium" shall accordingly be taken to include, but not to be limited to, solid state memories, optical and magnetic storage media, and carrier wave signals. The program code may be machine code or another code which can be converted into machine code by compilation and/or interpretation, such as source code in a high-level programming language, such as C++, or in any other suitable imperative or functional programming language, or virtual-machine code. The computer program product may comprise a data carrier provided with the program code or other means devised to control or direct a data processing apparatus to perform the method in accordance with the description. A data processing apparatus running the method typically includes a central processing unit, data storage means and an I/O-interface for signals or parameter values.

What is claimed is:

1. A method for controlling an active control system of a driving vehicle based on a short term irregularity of a road surface under the driving vehicle having at least a first wheel, the method comprising:
    a) determining a wheel speed sensor signal indicative of time dependent oscillations at the first wheel, using a wheel speed sensor, the time dependent oscillations being determined based on calculations of the variance of the time between two successive internal signals of the wheel speed sensor;

b) determining a second sensor signal indicative of a time dependent vertical movement of a chassis of the vehicle, using a second sensor, wherein the second sensor is one of an axle height sensor, an air suspension height sensor and a vertical accelerometer;

c) detecting, using a processor communicatively coupled with the wheel speed sensor and the second sensor, a short term irregularity of a road surface under the driving vehicle based on sensor fusion by combining the wheel speed sensor signal and the second sensor signal, wherein the detecting comprises comparing the amplitude of the time dependent oscillations to a first threshold and/or based on comparing the variance of the vertical movement signal to a second threshold; and d) adjusting, by the processor, one or more settings of the active control system of the driving vehicle in response to detection of the short term irregularity of a road surface, wherein the active control system is communicatively coupled with the processor.

2. The method of claim 1, wherein the wheel speed sensor signal is a wheel speed signal that is indicative of the time dependent behavior of the speed of the first wheel of the vehicle.

3. The method of claim 1, wherein the second sensor signal is a signal from an accelerometer of the vehicle.

4. The method of claim 1, wherein the time dependent oscillations of the wheel speed sensor signal are determined based on calculations of the variance of the time between two successive internal signals of the first sensor.

5. The method of claim 1, wherein determining the time dependent oscillations comprises using a matched filter.

6. The method of claim 1, wherein the determining a time dependent vertical movement of the vehicle chassis comprises determining a time dependent distance between the wheel axle of the first wheel and the vehicle chassis, using an axle height sensor.

7. The method of claim 1, wherein the determining a time dependent vertical movement of the vehicle chassis comprises determining a time dependent distance between the first wheel and the vehicle chassis, using an air suspension height sensor associated with first wheel.

8. The method of claim 1, wherein the determining a time dependent vertical movement of the vehicle chassis comprises determining vertical acceleration using a vertical accelerometer.

9. The method of claim 1, further comprising generating or updating a map of the current road surface condition based on one or more detected short term irregularities.

10. The method of claim 9, further comprising distributing information on one or more detected short term irregularities and/or derived therefrom using a driver assistance system.

11. The method of claim 1, further comprising updating a classification of the road surface based on one or more detected short term irregularities.

12. The method of claim 1, further comprising adjusting the settings of the active suspension of the vehicle based on one or more detected short term irregularities and/or information derived therefrom.

13. A system for controlling an active control system of a driving vehicle based on a short term irregularity of a road surface under a driving vehicle having a first wheel, the system comprising:

a) a wheel speed sensor configured to determine a wheel speed sensor signal indicative of time dependent oscillations at the first wheel, the time dependent oscillations being determined based on calculations of the variance of the time between two successive internal signals of the wheel speed sensor;

b) a second sensor configured to determine a second sensor signal indicative of a vertical movement of a chassis of the vehicle, wherein the second sensor is one of an axle height sensor, an air suspension height sensor and a vertical accelerometer; and c) an processor communicatively coupled with the wheel speed sensor and the second sensor, the processor configured to:

receive the wheel speed sensor signal and the second sensor signal;

detect a short term irregularity present of a road surface under the driving vehicle based on sensor fusion by combining the wheel speed sensor signal and the second sensor signal, wherein the detecting comprises comparing the amplitude of the time dependent oscillations to a first threshold and/or based on comparing the variance of the vertical movement signal to a second threshold; and adjust one or more settings of the active control system of the driving vehicle in response to detection of the short term irregularity of a road surface, wherein the active control system is communicatively coupled with the processor.

14. A tangible computer-readable medium including instructions stored thereon which, when executed by a processor, utilize a detected short term irregularity under a driving vehicle having a first wheel to control one or more operations of an active control system of the driving vehicle, by:

a) determining a wheel speed sensor signal indicative of time dependent oscillations at the first wheel, using a wheel speed sensor, the time dependent oscillations being determined based on calculations of the variance of the time between two successive internal signals of the wheel speed sensor;

b) determining a second sensor signal indicative of a vertical movement of a chassis of the vehicle, using a second sensor, wherein the second sensor is one of an axle height sensor, an air suspension height sensor and a vertical accelerometer;

c) detecting a short term irregularity of a road surface under the driving vehicle based on sensor fusion by combining the wheel speed sensor signal and the second sensor signal, wherein the detecting comprises comparing the amplitude of the time dependent oscillations to a first threshold and/or based on comparing the variance of the vertical movement signal to a second threshold; and d) adjusting one or more settings of the active control system of the driving vehicle in response to detection of the short term irregularity of a road surface.

15. The tangible computer-readable medium according to claim 14, wherein the wheel speed sensor signal is a wheel speed signal indicative of the time dependent behavior of the speed of the first wheel of the vehicle.

* * * * *